US011068595B1

(12) United States Patent
Chiang et al.

(10) Patent No.: US 11,068,595 B1
(45) Date of Patent: Jul. 20, 2021

(54) GENERATION OF FILE DIGESTS FOR CYBERSECURITY APPLICATIONS

(71) Applicant: Trend Micro Incorporated, Tokyo (JP)

(72) Inventors: Chia-Ming Chiang, Taipei (TW); Po-Han Hao, Taipei (TW); Kuo-Cheng Wang, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 99 days.

(21) Appl. No.: 16/672,924

(22) Filed: Nov. 4, 2019

(51) Int. Cl.
*G06F 21/56* (2013.01)

(52) U.S. Cl.
CPC .......... *G06F 21/567* (2013.01); *G06F 21/563* (2013.01); *G06F 21/565* (2013.01)

(58) Field of Classification Search
CPC ...... G06F 21/56; G06F 21/562; G06F 21/563; G06F 21/564; G06F 21/565; G06F 21/567
See application file for complete search history.

(56) References Cited

U.S. PATENT DOCUMENTS

| 7,865,947 | B2 | 1/2011 | Fanton et al. |
| 8,375,450 | B1 | 2/2013 | Oliver et al. |
| 8,769,683 | B1 | 7/2014 | Oliver |
| 8,925,087 | B1 | 12/2014 | Oliver et al. |
| 9,197,665 | B1 | 11/2015 | Cabot et al. |
| 9,361,458 | B1 | 6/2016 | Feng et al. |
| 9,690,937 | B1 | 6/2017 | Duchin et al. |
| 9,690,938 | B1 | 6/2017 | Saxe et al. |
| 10,162,967 | B1 | 12/2018 | Oliver et al. |
| 10,230,749 | B1* | 3/2019 | Rostami-Hesarsorkh ................... G06F 21/56 |
| 2003/0208693 | A1* | 11/2003 | Yoshida .................. H04L 67/28 726/26 |
| 2004/0086861 | A1* | 5/2004 | Omori .................... H03M 13/00 435/6.14 |
| 2006/0277459 | A1* | 12/2006 | Lemoine ............... G06F 40/154 715/234 |
| 2006/0291650 | A1* | 12/2006 | Ananth ................... H04L 9/065 380/46 |
| 2012/0231763 | A1* | 9/2012 | Zeng ................... H04W 12/128 455/410 |

(Continued)

FOREIGN PATENT DOCUMENTS

EP      1 678 635 B1    10/2013

OTHER PUBLICATIONS

Aharoni et al, "Identifying malicious activities form system execution traces", IEEE Xplore, pp. 1-7 (Year: 2016).*

(Continued)

*Primary Examiner* — Richard A McCoy
(74) *Attorney, Agent, or Firm* — Okamoto & Benedicto LLP

(57) ABSTRACT

A cybersecurity server receives an executable file. The executable file is disassembled to generate assembly code of the executable file. High-entropy blocks and blocks of printable American Standard Code for Information Interchange (ASCII) characters are removed from the assembly code. Instructions of the assembly code are normalized, chunked, and merged into a data stream. The digest of the data stream is calculated using a fuzzy hashing algorithm. The similarity of the digest to a malicious digest is determined to evaluate the executable file for malware.

13 Claims, 6 Drawing Sheets

(56) References Cited

U.S. PATENT DOCUMENTS

| | | | | |
|---|---|---|---|---|
| 2016/0094564 | A1* | 3/2016 | Mohandas | H04L 63/145 726/24 |
| 2016/0164900 | A1* | 6/2016 | Pericin | G06F 21/565 726/23 |
| 2016/0335437 | A1* | 11/2016 | Yang | G06F 21/56 |
| 2020/0104492 | A1* | 4/2020 | Boulton | G06F 21/563 |
| 2020/0311268 | A1* | 10/2020 | Kostyushko | G06F 21/561 |

OTHER PUBLICATIONS

Trend Micro Security Intelligence Blog—How Machine Learning echniquest Helped US find Massive Certificate Abuse by BroweFox, Jun. 11, 2018, 8 pages, available at https://blog.trendmicro.com/trendlabs-security-intelligence/how-machine-learning-techniques-helped-us-find-massive-certificate-abuse-by-browsefox/.

Wikipedia—Locality-sentive hashing, 8 pages [retrieved on May 20, 2019], retrieved from the internet: https://wikipedia.org/wiki/Locality-sensitive_hashing.

Joris Kinable, et al. "Malware Classification based on Call Graph Clustering", Aug. 27, 2010, pp. 1-12, Aalto University, Dept of Information and Computer Science, Finland.

Swathi Pai, et al. "Clustering for malware classification", published online on Jan. 27, 2016, 13 pages, J Comput virol Hack Tech.

Peng Li, et al. "On Challenges in Evaluating Malware Clustering", 2010, 18 pages.

Kyle Soska, et al. "Automatic Application Identification from Billions of Files", Aug. 13, 2017, 10 pages.

Roberto Perdisci, et al. "VAMO: Towards a Fully Automated Malware Clustering Validity Analysis", Dec. 3-7, 2012, 10 pages.

peHash: A Novel Approach to Fast Malware Clustering, Dec. 7, 2008, 8 pages.

Irfan Ui Haq, et al. "Malware Lineage in the Wild", Oct. 14, 2017, 15 pages.

Usha Narra "Clustering versus SVM for Malware Detection", May 2015, 71 pages, Master's Theses and Graduate Research, Dept. of Computer Science, San Jose State University, San Jose, California.

Mark Stamp "A Survey of Machine Learning Algorithms and Their Application in Information Security", Sep. 2018, 23 pages, San Jose State University, San Jose, California.

Jakub Lokoc, et al. "k-NN Classification of Malware in HTTPS Traffic Using the Metric Space Approach", Apr. 2016, 16 pages, SIRET research group, Dept. of Software Engineering, Charles University, Prague, Czech Republic.

Joy Nathalie Avelino, et al. "Ahead of the Curve: A Deeper Understanding of Network Threats Through Machine Learning", 2018, 17 pages, Trend Micro, A TrendLabs Research Paper.

Animesh Nandi, et al. "Anomaly Detection Using Program Control Flow Graph Mining from Execution Logs", Aug. 2016, 10 pages, IBM Research, IIT Kanpur.

Managed Detection and Response—Definition, 7 pages [retrieved on Jun. 14, 2019], retrieved from the internet: https://www.trendmicro.com/vinfo/us/security/definition/managed-detection-and-response.

Cluster analysis—Wikipedia, 19 pages [retrieved on Jun. 11, 2019], retrieved from the internet: https://en.wikipedia.org/wiki/Cluster_analysis.

K-nearest neighbors algorithm—Wikipedia, 10 pages [retrieved on Jun. 11, 2019], retrieved from the internet: https://en.wikipedia.org/wiki/K-nearest_neighbors_algorithm.

Autoencoder—Wikipedia, 6 pages [retrieved on Jun. 11, 2019], retrieved from the internet: https://en.wikipedia.org/wiki/Autoencoder.

DBSCAN—Wikipedia, 7 pages [retrieved on Jun. 11, 2019], retrieved from the internet: https://en.wikipedia.org/wiki/DBSCAN.

Jonathan Oliver, et al. "TLSH—A Locality Sensitive Hash", Nov. 21-22, 2013, 7 pages, The 4th Cybercrime and Trustworthy Computing Workshop, Sydney, AU.

Ban Xiaofang, et al. "Malware Variant Detection Using Similarity Search over Content Fingerprint", May 31-Jun. 2, 2014, 6 pages, IEEE the 26th Chinese Control and Decision Conference.

Computer Forensics, Malware Analysis & Digital Investigation: File Entropy explained, 4 sheetstr [retrieved on Oct. 31, 2019], retrieved from the internet: www.forensikb.com/2013/03/file-entropy-explained.html.

Using File Entropy to Identify "Ransomwared" Files—SANS Internet Storm Center, 5 sheets [retrieved on Oct. 31, 2019], retrieved from the internet: https://isc.sans.edu/forums/diary/Using+File+Entropy+to-Identify+Rasomwared+Files/21351/.

Entropy (information theory)—Wikipedia, 16 sheets [retrieved on Oct. 31, 2019], retrieved from the internet: https://en.wikipedia.org/wiki/Entropy_(information_theory).

Metada (CLI)—Wikipedia, 3 sheets [retrieved on Oct. 31, 2019], retrieved from the internet: https://en.wikipedia.org/wiki/Metadata_(CLI).

Metadata and Self-Describing Components—Microsoft Docs, Mar. 29, 2017, 7 sheets [retrieved on Oct. 31, 2019], retrieved from the internet: https://docs.microsoft.com/en-us/dotnet/standard/metadata-and-self-describing-components#metadata-and-the-pe-file-structure.

Kevin Burton "Physical Layout of a .NET Assembly", Feb. 14, 2002, 2 sheets [retrieved on Nov. 4, 2019], retrieved from the internet: www.informit.com/articles/article.aspx?p=25350&seqNum=3.

* cited by examiner

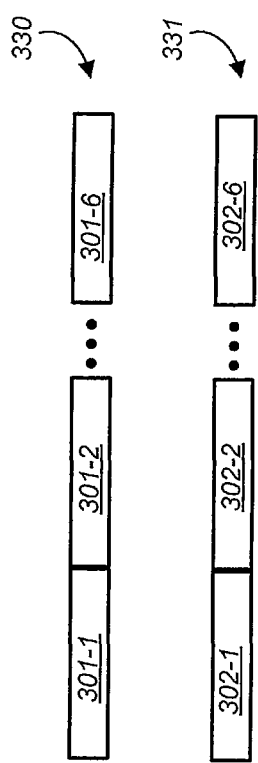
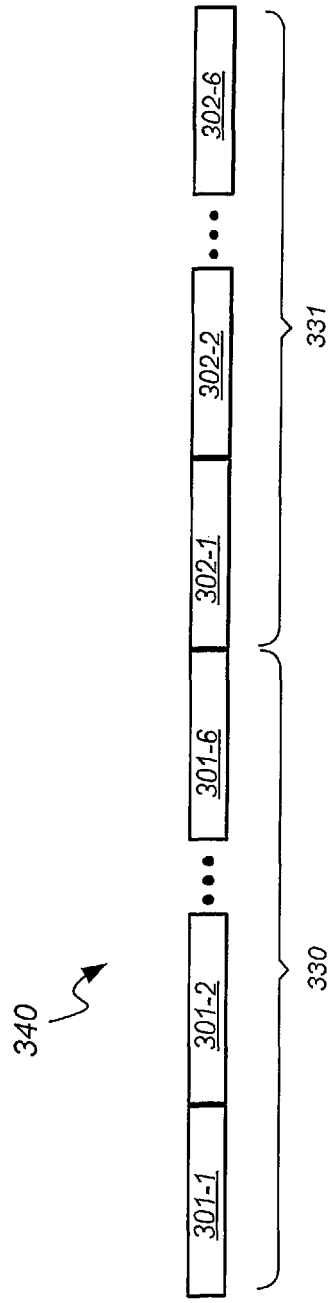
FIG. 4
FIG. 5

GENERATION OF FILE DIGESTS FOR CYBERSECURITY APPLICATIONS

BACKGROUND OF THE INVENTION

1. Field of the Invention

The present invention relates generally to cybersecurity, and more particularly but not exclusively to generation of file digests.

2. Description of the Background Art

Malware may be detected using various antivirus techniques, including by looking for malware signatures. For example, antivirus researchers may collect samples of malware and analyze the samples to identify patterns indicative of malware. The patterns may be deployed in an endpoint computer to scan files for malware. The patterns may also be clustered to identify malware families.

Malware may be in the form of an executable file, such as in Portable Executable (PE) format for computers running the Microsoft Windows™ operating system or in Executable and Linkable Format (ELF) for computers running a Linux™-based operating system. A digest of a malicious executable file may be calculated using a hashing algorithm. The digest may be used as a pattern for detection and clustering of malicious executable files. An ongoing problem with detecting malicious executable files is that there are multitudes of malicious executable files in the wild, and the number of mutated and new malicious executable files continue to rapidly increase.

SUMMARY

In one embodiment, a cybersecurity server receives an executable file. The executable file is disassembled to generate assembly code of the executable file. High-entropy blocks and blocks of printable American Standard Code for Information Interchange (ASCII) characters are removed from the assembly code. Instructions of the assembly code are normalized, chunked, and merged into a data stream. The digest of the data stream is calculated using a fuzzy hashing algorithm. The similarity of the digest to a malicious digest is determined to evaluate the executable file for malware.

These and other features of the present invention will be readily apparent to persons of ordinary skill in the art upon reading the entirety of this disclosure, which includes the accompanying drawings and claims.

DESCRIPTION OF THE DRAWINGS

FIG. 4 shows code blocks as data streams in accordance with an embodiment of the present invention.

FIG. 5 shows the code blocks of FIG. 4 merged as a single data stream in accordance with an embodiment of the present invention.

The use of the same reference label in different drawings indicates the same or like components.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
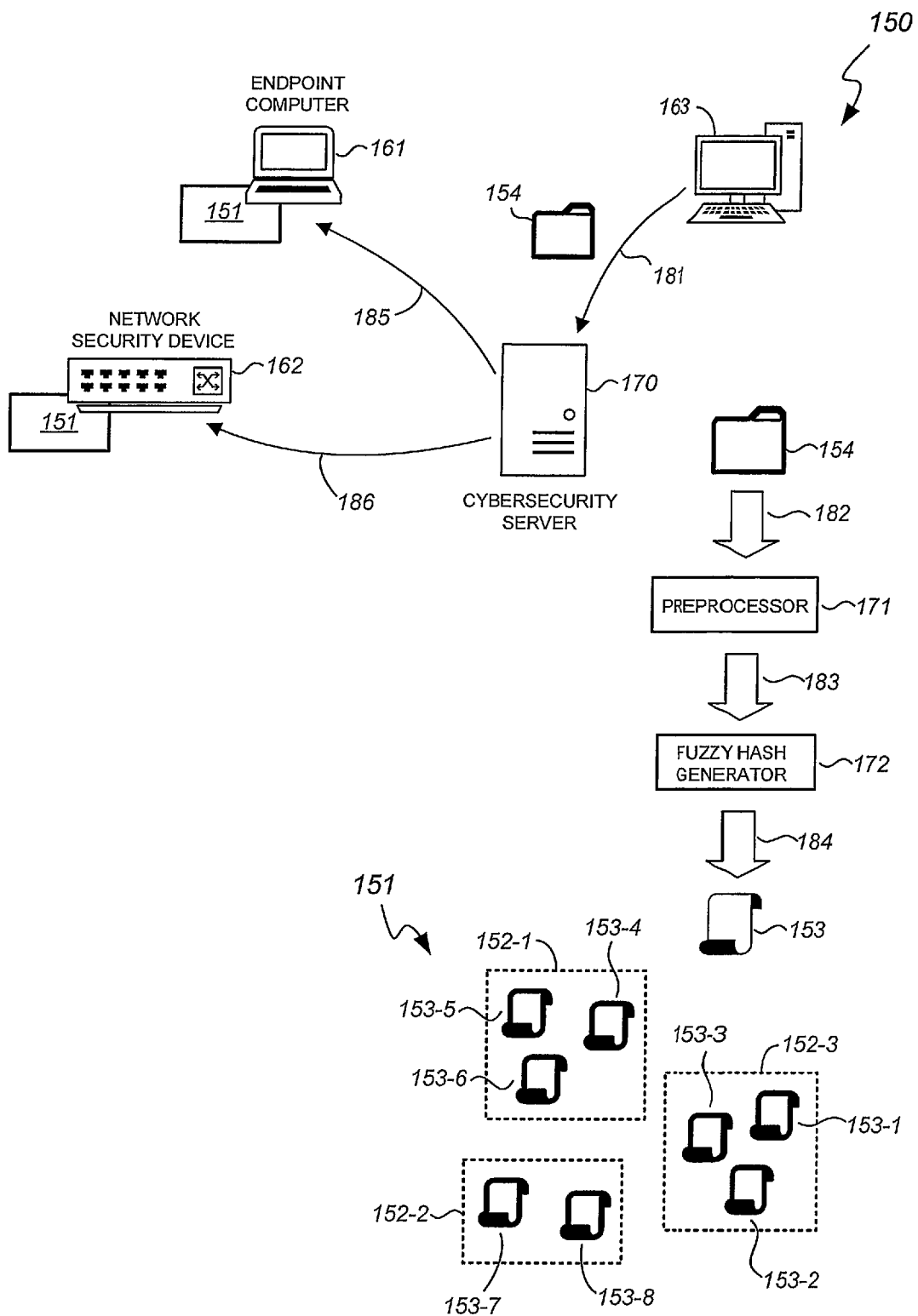
FIG. 1 shows a logical diagram of a system for identifying malicious executable files in accordance with an embodiment of the present invention.

FIG. 1 shows a logical diagram of a system 150 for identifying malicious executable files in accordance with an embodiment of the present invention. The system 150 is explained in the context of PE files for illustration purposes only. In light of the present disclosure, it can be appreciated that embodiments of the present invention are equally applicable to other executable files, such as ELF files. Malicious executable files are also referred to herein simply as "malware."

In the example of FIG. 1, the system 150 includes a cybersecurity server 170. The cybersecurity server 170 may comprise hardware and software of a cloud computing infrastructure, a dedicated server, or other computing device of a cybersecurity vendor, such as Trend Micro™, Incorporated. In one embodiment, the cybersecurity server 170 is configured to generate a digest 153 of an executable file 154. The cybersecurity server 170 may be configured to receive the executable file 154 from a user-submission, a request to evaluate the executable file 154 for malware, a third-party feed, or from other internal or external source. In the example of FIG. 1, the cybersecurity server 170 receives the executable file 154 (see arrow 181) from a computer 163 over the Internet.

In the example of FIG. 1, the cybersecurity server 170 includes a preprocessor 171 and a fuzzy hash generator 172. The preprocessor 171 may be configured to receive the executable file 154 (see arrow 182) and extract code blocks from the executable file 154. Extraction of the code blocks may include disassembling the executable file 153 into assembly code, removing noise-inducing data blocks (e.g., high-entropy blocks and printable American Standard Code for Information Interchange (ASCII) character blocks) from the assembly code, normalizing instructions of the assembly code, and chunking the normalized instructions into code blocks. The preprocessor 171 may merge the code blocks into a data stream, which is input to the fuzzy hash generator 172.

The fuzzy hash generator 172 receives the data stream (see arrow 183) and calculates a digest of the data stream to generate the digest 153 (see arrow 184) of the executable file 154. More particularly, the digest 153 that is used to represent the executable file 154 is calculated from the data stream generated by the preprocessor 171 from relevant portions, instead of the entirety, of the executable file 154.

As its name indicates, the fuzzy hash generator 172 employs a fuzzy hashing algorithm, such as a locality-sensitive hashing algorithm, to calculate a digest of the data being hashed. In one embodiment, the fuzzy hash generator 172 employs the Trend Micro Locality Sensitive Hash (TLSH) algorithm to calculate the digest 153. Open source program code for implementing the TLSH algorithm is available on the Internet.

Generally speaking, a locality sensitive hashing algorithm may extract many very small features (e.g., 3 bytes) of the data being hashed and put the features into a histogram, which is encoded to generate the digest of the data. The mathematical distance between two digests may be measured to determine the similarity of the two digests, and hence the similarity of the corresponding data from which the digests were calculated. The shorter the distance, the more similar the digests. The distance may be compared to a predetermined distance threshold to detect similarity. Open source program code of the TLSH algorithm includes a distance measurement function, which may be used to determine similarity between two digests 153 that were calculated using the TLSH algorithm.

The similarity of a target digest 153 (i.e., calculated from an executable file being evaluated) to a malicious digest 153 (i.e., calculated from a malicious executable file) may be determined to detect whether or not the target digest 153 is also malicious. For example, the distance between the digest 153 of the executable file 154 and a digest 153-1 of a malicious executable file may be measured and compared to a predetermined distance threshold. The executable file 154 may be deemed to be malware when the distance between the digest 153 and the digest 153-1 is less than the predetermined distance threshold.

A plurality of digests 153 (i.e., 153-1, 153-2, . . . ) may also be clustered to facilitate similarity determinations and to identify malware families. For example, the digests 153 may be grouped into clusters 152 (i.e., 152-1, 152-2, . . . ), with each cluster 152 comprising digests 153 that are similar to one another. The digests 153 may be grouped using a suitable clustering algorithm, such as the K-nearest neighbors (KNN) clustering algorithm, Density-based spatial clustering of applications with noise (DBSCAN) clustering algorithm, ANN clustering algorithm, hierarchical clustering algorithm, etc.

A cluster 152 may have a corresponding label that indicates whether the cluster 152 is good or malicious. A cluster 152 that only has malicious digests 153 or primarily (e.g., over 90% of its members) malicious digests 153 may labeled as malicious. Similarly, a cluster 152 that only has good digests 153 (i.e., from known good executable files) or primarily good digests 153 may labeled as good.

A center may be determined for each cluster 152. The center of a cluster 152, which is also in the format of a TLSH digest in this example, is representative of the digests 153 of the cluster 152. The center of the cluster 152 may be described as an average, median, or some other relationship between the members of the cluster, depending on the clustering algorithm employed.

A target digest 153 may be compared to the centers of the clusters 152 to find a cluster 152 with members that are most similar to the target digest 153. For example, in the case where the target digest 153 is most similar to a center of a malicious cluster 152, the target digest 153 may also deemed to be malicious. The target 153 may be deemed to be good when the target 153 is most similar to a center of a good cluster 152.

As can be appreciated from the foregoing, the plurality of digests 153 may be used individually or in clusters 152. In the example of FIG. 1, signatures 151 comprise the plurality of digests 153. The signatures 151 may be provided to an endpoint computer 161 to detect malicious executable files therein (see arrow 185). The endpoint computer 161 may be a user computer, a central server, or some other computer where malicious executable file detection is performed. The endpoint computer 161 may receive a target executable file, generate the digest of the target executable file as explained above with reference to the digest 153, and compare the resulting digest to the signatures 151. The target executable file may be deemed to be malware when its digest is similar to a malicious digest 153 or to members of a malicious cluster 152.

The signatures 151 may also be provided to a network security device 162 (see arrow 186). The network security device 162 may comprise a router, network appliance, or some other computing device that screens network traffic of a computer network. The network security device 162 may receive network traffic, extract a target executable file from the network traffic (e.g., at layer 7), generate a digest of the target executable file as explained above with reference to the digest 153, and compare the resulting digest to the signatures 151. The target executable file may be deemed to be malware when its digest is similar to a malicious digest 153 or to members of a malicious cluster 152.

Figure 2:
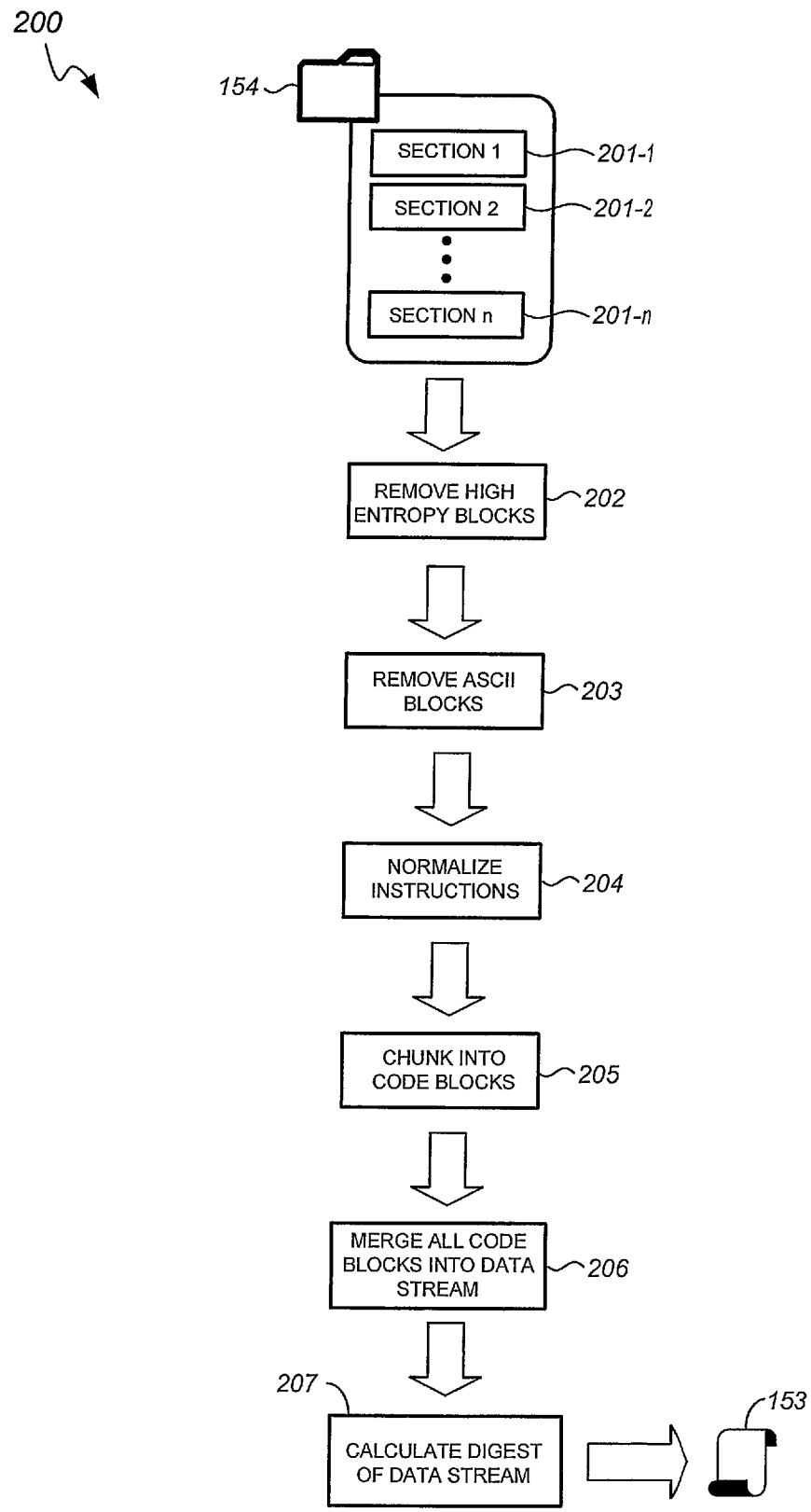
FIG. 2 shows a flow diagram of a method of generating a digest of an executable file in accordance with an embodiment of the present invention.

FIG. 2 shows a flow diagram of a method 200 of generating a digest 153 of an executable file 154 in accordance with an embodiment of the present invention. The executable file 154 may comprise a plurality of sections 201 (i.e., 201-1, 201-2, . . . ). The executable file 154 may also include other portions, such as headers, that are not shown in the example of FIG. 2. The sections 201 may contain code, data, resources, and other executable information of the executable file 154. In one embodiment, the digest 153 is generated only from sections 201, and not from other portions of the executable file 154. Because the executable file 154 is in binary form, the sections 201 are disassembled using a suitable disassembler to convert the sections 201 to assembly code. The assembly code may comprise instructions, printable American Standard Code for Information Interchange (ASCII) characters, and other data.

Generally speaking, a "block" is a contiguous portion of data. For each section 201, blocks that have high entropy are filtered out (step 202). "Entropy" is a measure of randomness of the data of a block. Entropy is commonly-used to detect encrypted and compressed data. More specifically, malicious executable files may employ a file packing algorithm that generates encrypted data, which result in high entropy. Removing blocks that have entropy exceeding a predetermined entropy threshold reduces noise induced by encrypted data.

Similarly, blocks of printable ASCII characters are filtered out (step 203) to minimize variance. In one embodiment, a printable ASCII character block is removed only when its block size is greater than 100 bytes; the printable ASCII character block is retained when its block size is 100 bytes or smaller. Generally speaking, high-entropy and printable ASCII blocks are noise-inducing blocks. Removing high-entropy and printable ASCII blocks advantageously allows for generation of a digest 153 that primarily focuses on instructions that affect the behavior of the executable file 154 at runtime.

Instructions that remain in the section 201, after removal of the noise-inducing blocks, are normalized (step 204). Normalization of the instructions reduces variance caused by register differences for the same instruction. This advantageously allows for a digest 153 that is focused on the behavior of the instructions instead of register locations.

An instruction may be normalized by encoding the assembly operation performed by the instruction. For example, an instruction may be normalized by encoding the instruction into a predetermined, fixed-length normalized code. In one embodiment, the normalized code is an 8-bit code, with each bit indicating the assembly operation performed by the instruction. For example, the 8-bit code may indicate a memory read (e.g., "00000001"), memory write (e.g., "00000010"), stack read (e.g., "00000100"), stack write (e.g., "00001000"), flag read (e.g., "00010000"), flag write (e.g., "00100000"), jump near (e.g., "01000000"), or jump far (e.g., "10000000") operation. In one embodiment, an operand, if any, of an instruction is discarded in the normalization of the instruction.

The remaining portions of the section 201 are chunked into individual code blocks (step 205). A "code block" comprises contiguous instructions of assembly code. In one embodiment, a code block comprises at least 5 instructions and is delimited from other code blocks by a call instruction. All of the code blocks are merged into a single data stream (step 206). The digest 153 of the data stream is calculated (step 207), e.g., using the TLSH algorithm.

Figure 3:
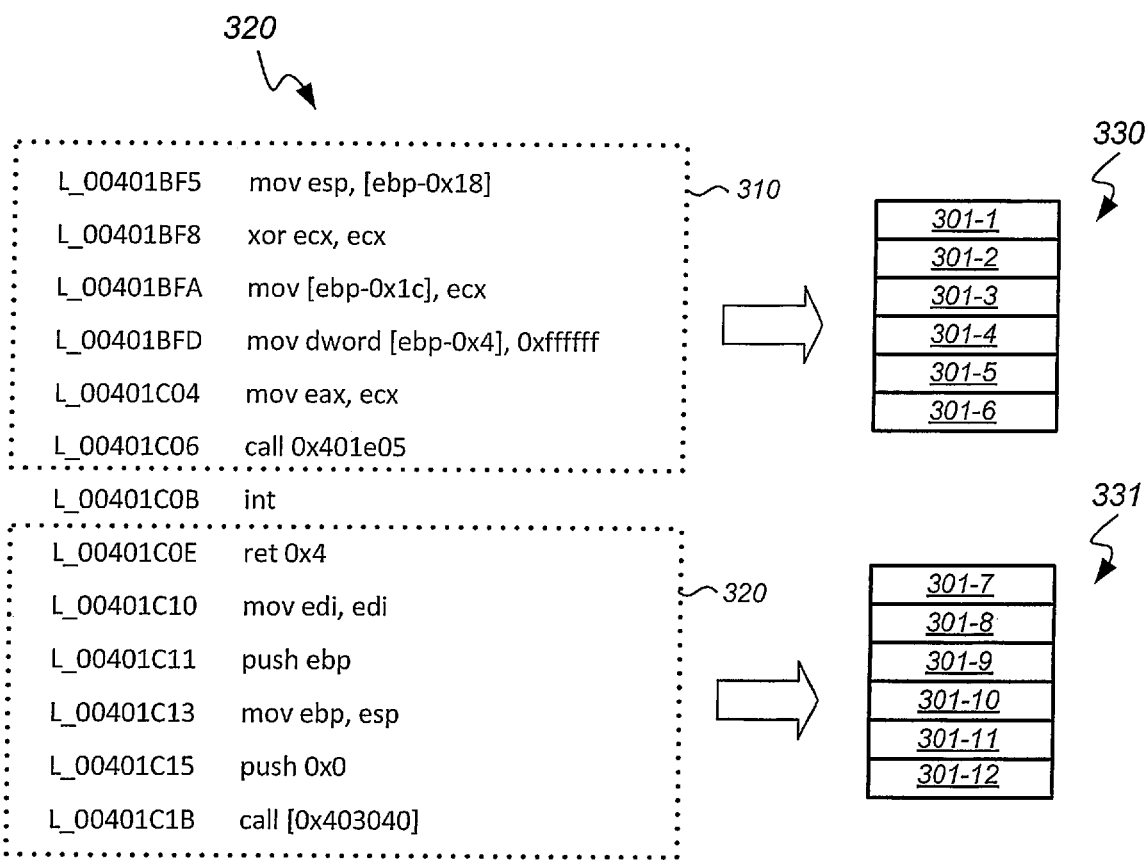
FIG. 3 shows a portion of assembly code of an executable file for which a digest is being generated in accordance with an embodiment of the present invention.

FIG. 3 shows a portion 320 of assembly code of an executable file for which a digest is being generated in accordance with an embodiment of the present invention. The portion 320 includes 13 lines of assembly code from location "L00401BF5" to location "L_00401C1B". In the example of FIG. 3, each instruction is normalized by encoding the instruction into a corresponding normalized code 301. That is, the instructions from locations "L00401BF5" to "L00401C06" are encoded into normalized codes 301-1 to 301-6, respectively. Similarly, the instructions from locations "L00401C0E" to "L00401C1B" are encoded into normalized codes 301-7 to 301-12, respectively. Note that the assembly code "int" at location "L00401C0B" does not have a corresponding predetermined normalized code because "int" is not an instruction that performs an assembly operation. Accordingly, the assembly code "int" is discarded during normalization.

As a particular example, the instruction at location "L00401BF5" is encoded to a normalized code 301-1, which is an 8-bit code "00000001" that represents memory read; the instruction at location "L00401BF8" is encoded to a normalized code 301-2, which is an 8-bit code "00100000" that represents flag write; the instruction at location "L00401BFA" is encoded to a normalized code 301-3, which is an 8-bit code "00000010" that represents memory write; etc.

In the example of FIG. 3, the instructions of a data block 310 are encoded to normalized codes 301-1 to 301-6 and chunked as a code block 330. In one embodiment, a code block is delimited from other code blocks by a call instruction. More particularly, the end of the code block 330 is delimited from other code blocks by the call instruction at location "L00401C06", which is encoded to normalized code 301-6. Similarly, the instructions of a data block 320 are encoded to normalized codes 301-7 to 301-12 and chunked as a code block 331. The end of the code block 331 is delimited from other code blocks by the call instruction at location "L00401C1B", which is encoded to normalized code 301-12.

FIG. 4 shows the code blocks 330 and 331 as data streams. More particularly, each of the normalized codes 301 are sequentially arranged one after another as a stream of data. FIG. 5 shows the code blocks 330 and 331 merged as a single data stream 340. In the example of FIG. 5, the code blocks 330 and 331 are merged by concatenation. It is to be noted that the data streams of FIGS. 4 and 5 are also referred to as a "byte stream" because each of the normalized code 301 is an 8-bit data in this example. The digest of the data stream 340 is calculated using a fuzzy hash algorithm (e.g., the TLSH algorithm).

Figure 6:
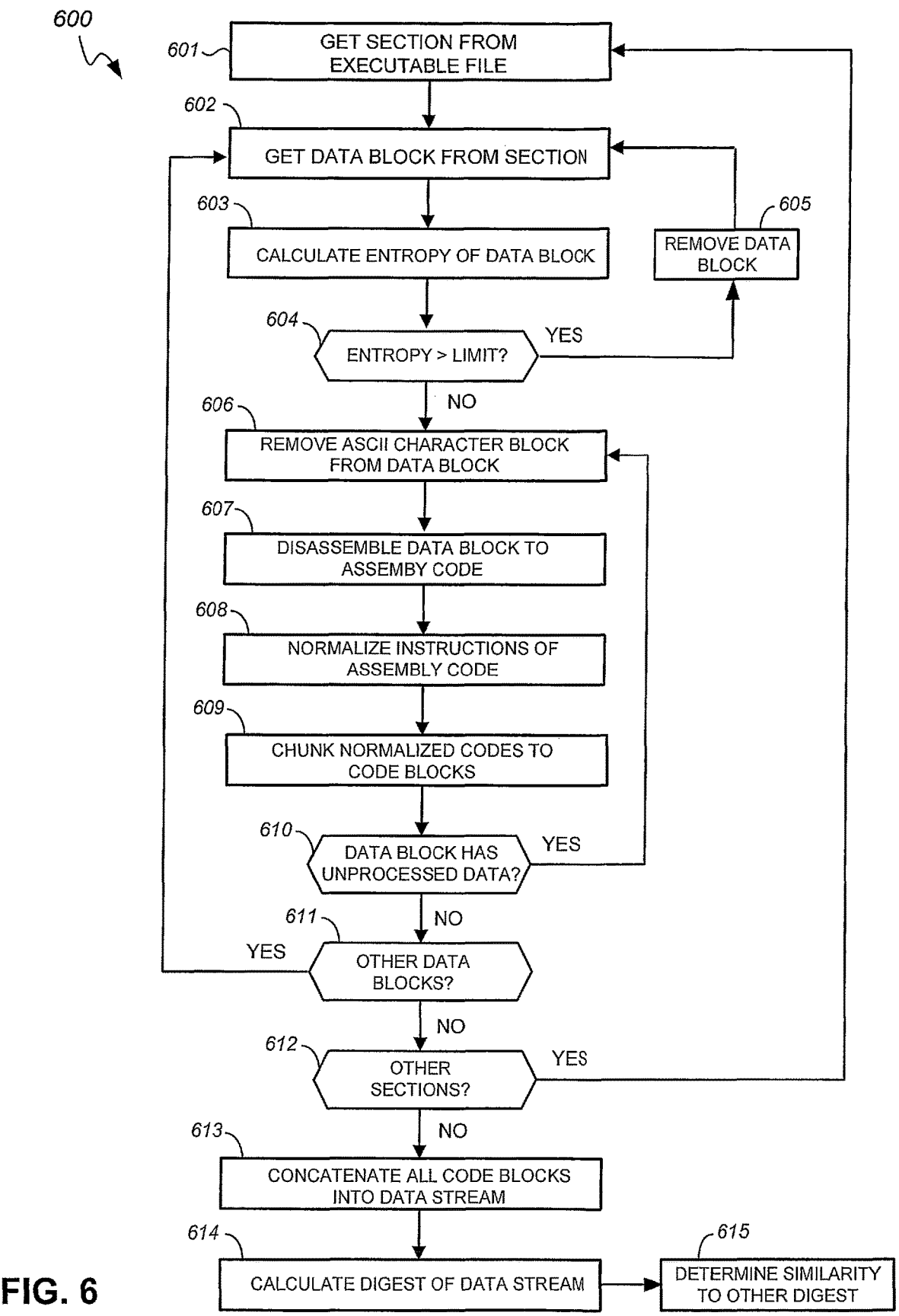
FIG. 6 shows a flow diagram of a method of generating a digest of an executable file in accordance with an embodiment of the present invention.

FIG. 6 shows a flow diagram of a method 600 of generating a digest of an executable file in accordance with an embodiment of the present invention. The method 600 may be performed by the cybersecurity server 170 as configured with the preprocessor 171 and the fuzzy generator 172. As can be appreciated, other components may also be used without detracting from the merits of the present invention.

The method 600 includes receiving an executable file that has a plurality of sections. A section of the plurality of sections is extracted from the executable file (step 601). A fixed-size data block, e.g., 4 kB data block, is extracted from the section (step 602). The entropy of the data block is calculated (step 603). The data block is removed from the section when the entropy of the data block is greater than a predetermined entropy limit (step 604 to step 605). Otherwise, processing of the data block continues (step 604 to step 606). Printable ASCII character blocks, if any are present in the data block, are removed from the data block (step 606). The data block is disassembled to convert the data block to assembly code (step 607). The instructions of the assembly code are normalized by encoding the instructions to corresponding predetermined normalized codes (step 608). The normalized codes are chunked into code blocks (step 609). The processing of the data block continues when the data block has remaining unprocessed data (step 610 to step 606).

When the data block has been fully processed (step 610 to step 611), processing of the section continues when the section has remaining unprocessed data blocks (step 611 to step 602). When the section has been fully processed (step 611 to step 612), the processing of the executable file continues when the executable file has remaining unprocessed sections (step 612 to step 601). Otherwise, when all the sections of the executable file have been processed (step 612 to step 613), the code blocks are merged by concatenating the code blocks into a single data stream (step 613). The digest of the data stream, which is used as the digest of the executable file, is calculated (step 614).

The similarity between the digest and another digest may be determined to determine if the executable file is malicious or a member of a particular malware family (step 615). For example, the executable file is detected to be malicious when the digest is similar to a malicious digest or to members of a cluster of malicious digests. The executable file is detected to be of the same malware family as malware executable files whose digests are members of a malicious cluster when the digest is similar to the members of the malicious cluster. Corrective action may be performed in response to detecting that the executable file is malicious. For example, the executable file may be prevented from being executed in a computer by putting the executable file in quarantine, blocking network traffic that carries the executable file, deleting the executable file, etc.

Figure 7:
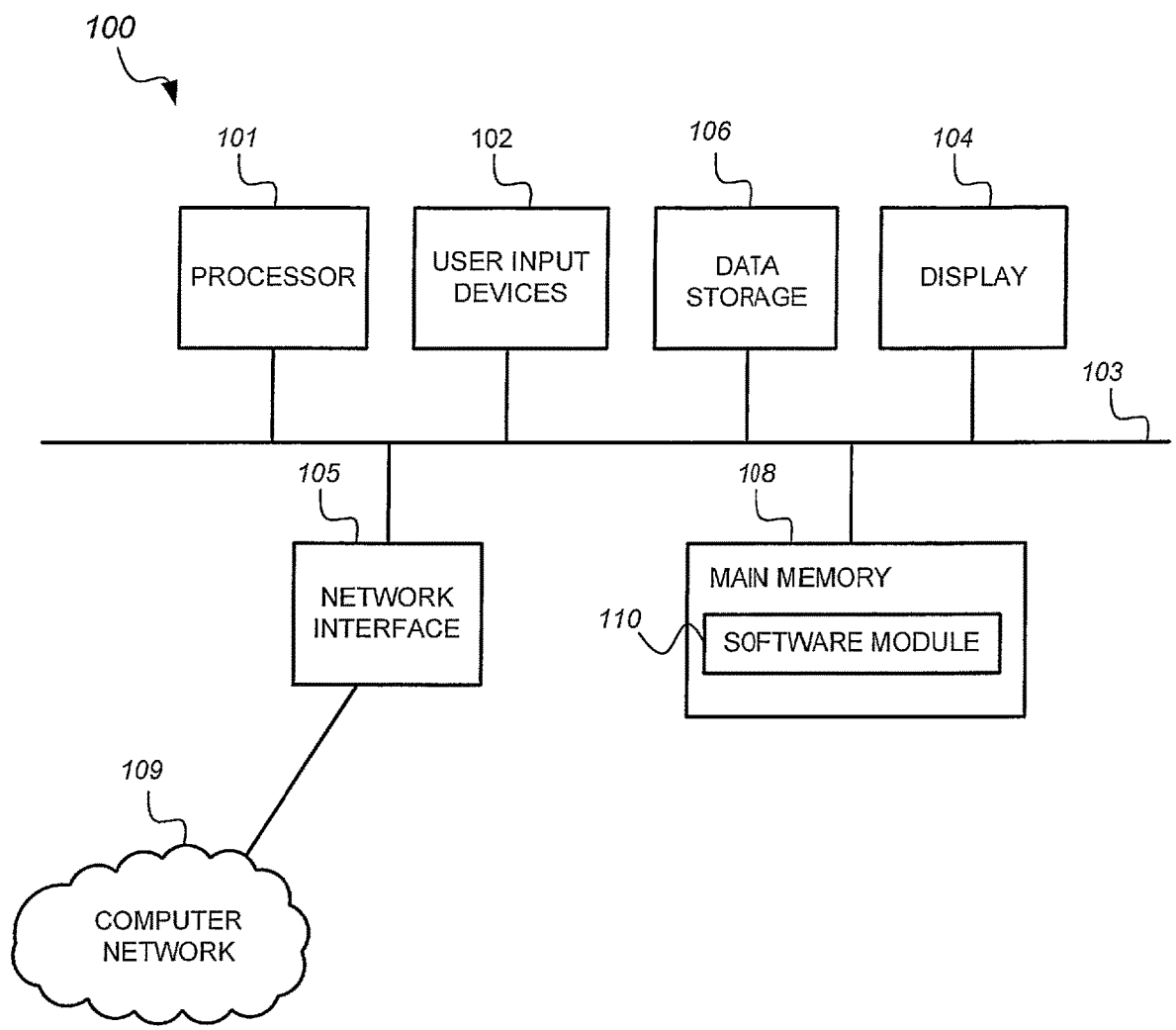
FIG. 7 shows a logical diagram of a computer system that may be employed with embodiments of the present invention.

Referring now to FIG. 7, there is shown a logical diagram of a computer system 100 that may be employed with embodiments of the present invention. The computer system 100 may be employed as to cybersecurity server 170 or another computer described herein. The computer system 100 may have fewer or more components to meet the needs of a particular application. The computer system 100 may include one or more processors 101. The computer system 100 may have one or more buses 103 coupling its various components. The computer system 100 may include one or more user input devices 102 (e.g., keyboard, mouse), one or more data storage devices 106 (e.g., hard drive, optical disk, solid state drive), a display screen 104 (e.g., liquid crystal display, flat panel monitor), a computer network interface 105 (e.g., network adapter, modem), and a main memory 108 (e.g., random access memory). The computer network interface 105 may be coupled to a computer network 109, which in this example includes the Internet.

The computer system 100 is a particular machine as programmed with one or more software modules 110, comprising instructions stored non-transitory in the main memory 108 for execution by the processor 101 to cause the computer system 100 to perform corresponding programmed steps. An article of manufacture may be embodied as computer-readable storage medium including instructions that when executed by the processor 101 cause the computer system 100 to be operable to perform the functions of the one or more software modules 110.

In one embodiment where the computer system 100 is configured as a cybersecurity server 170, the software modules 110 comprise a preprocessor and a fuzzy hash generator.

Systems and methods for generating file digests have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of generating a digest of an executable file, the method comprising:
   receiving a target executable file;
   disassembling the target executable file into assembly code;
   filtering out high-entropy blocks that have entropy exceeding an entropy threshold and printable ASCII character blocks from the assembly code to generate a noise-reduced assembly code;
   normalizing instructions of the noised-reduced assembly code into normalized codes;
   chunking the normalized codes into a plurality of code blocks;
   merging the plurality of code blocks to generate a data stream;
   calculating a digest of the datastream;
   determining similarity of the digest to a malicious digest; and
   detecting that the target executable file is malicious based on similarity of the digest to the malicious digest.

2. The method of claim 1, wherein normalizing the instructions of the noised-reduced assembly code into the normalized codes comprises:
   encoding each instruction into a normalized code.

3. The method of claim 2, wherein the normalized code indicates an assembly operation performed by the instruction.

4. The method of claim 3, wherein the normalized code discards an operand of the instruction.

5. The method of claim 4, wherein the normalized code has a plurality of bits, and a bit of the normalized code indicates the assembly operation.

6. The method of claim 1, wherein merging the plurality of code blocks to generate the data stream comprises:
   concatenating the plurality of code blocks.

7. The method of claim 1, wherein each of the plurality of code blocks is delimited by a call instruction.

8. The method of claim 1, wherein calculating the digest of the data stream comprises:
   applying a locality-sensitive hashing function on the data stream.

9. A system comprising:
   a cybersecurity server comprising a processor and memory, the memory storing instructions that when executed by the processor cause the cybersecurity server to perform the steps of:
   receiving a target executable file;
   disassembling the target executable file into assembly code;
   removing high-entropy blocks that have entropy exceeding an entropy threshold and printable ASCII character blocks from the assembly code to generate a noise-reduced assembly code;
   normalizing instructions of the noise-reduced assembly code into normalized codes;
   chunking the normalized codes into a plurality of code blocks;
   merging the plurality of code blocks to generate a data stream;
   calculating a digest of the data stream;
   determining similarity of the digest to a malicious digest; and
   detecting that the target executable file is malicious based on similarity of the digest to the malicious digest.

10. The system of claim 9, further comprising:
    a first computer that sent the target executable file to the cybersecurity server over the Internet.

11. The system of claim 9, wherein the instructions stored in the memory when executed by the processor cause the cybersecurity server to perform the step of calculating the digest of the data stream using a locality-sensitive hashing algorithm.

12. A method of generating a digest of an executable file, the method comprising:
    removing high-entropy blocks that have entropy exceeding an entropy threshold and printable ASCII character blocks from assembly code of an executable file to generate a noise-reduced assembly code;
    encoding instructions of the noise-reduced assembly code into normalized codes, each of the normalized codes being an encoded value of a corresponding instruction of the noise-reduced assembly code and indicating an assembly operation of the corresponding instruction;
    chunking the normalized codes into a plurality of code blocks;
    merging the code blocks;
    calculating a locality-sensitive hash of the merged code blocks to generate a digest of the executable file;
    measuring a distance between the digest and a malicious digest; and
    preventing the executable file from being executed in response to the distance being less than a threshold distance.

13. The method of claim 12, wherein the malicious digest is representative of a cluster of malicious digests.

* * * * *